United States Patent
Liao

(10) Patent No.: US 8,988,669 B2
(45) Date of Patent: Mar. 24, 2015

(54) POWER MONITOR FOR OPTICAL FIBER USING BACKGROUND SCATTERING

(71) Applicant: JDS Uniphase Corporation, Milpitas, CA (US)

(72) Inventor: Kai-Hsiu Liao, Mountain View, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 143 days.

(21) Appl. No.: 13/868,819

(22) Filed: Apr. 23, 2013

(65) Prior Publication Data

US 2014/0313513 A1    Oct. 23, 2014

(51) Int. Cl.
*G01N 21/00*    (2006.01)
*G01J 1/42*    (2006.01)

(52) U.S. Cl.
CPC ..................................... *G01J 1/4257* (2013.01)
USPC ........................................................ 356/73.1

(58) Field of Classification Search
CPC .......... G01M 11/3145; G01M 11/335; G01M 11/33; G01M 11/3109; G01M 11/338
USPC ........................................................ 356/73.1
See application file for complete search history.

(56) References Cited

U.S. PATENT DOCUMENTS

| | | | | |
|---|---|---|---|---|
| 4,654,520 | A | * | 3/1987 | Griffiths .................... 250/227.14 |
| 4,714,829 | A | * | 12/1987 | Hartog et al. ............. 250/227.14 |
| 5,015,067 | A | | 5/1991 | Levatter ......................... 385/123 |
| 5,319,195 | A | | 6/1994 | Jones et al. ............... 250/227.11 |
| 7,146,073 | B2 | | 12/2006 | Wan ................................ 385/29 |
| 7,957,438 | B2 | | 6/2011 | Simons et al. ............ 372/29.021 |

* cited by examiner

*Primary Examiner* — Tarifur Chowdhury
*Assistant Examiner* — MD Rahman
(74) *Attorney, Agent, or Firm* — JDS Uniphase Corporation

(57) ABSTRACT

An optical power monitoring device includes a photodetector disposed in close proximity to the cladding of an optical fiber for measuring Rayleigh scattered light from the core of the optical fiber. To ensure only Rayleigh scattered light is measured, a cladding stripper is provided to remove any cladding light prior taking a reading with the photodetector.

20 Claims, 4 Drawing Sheets

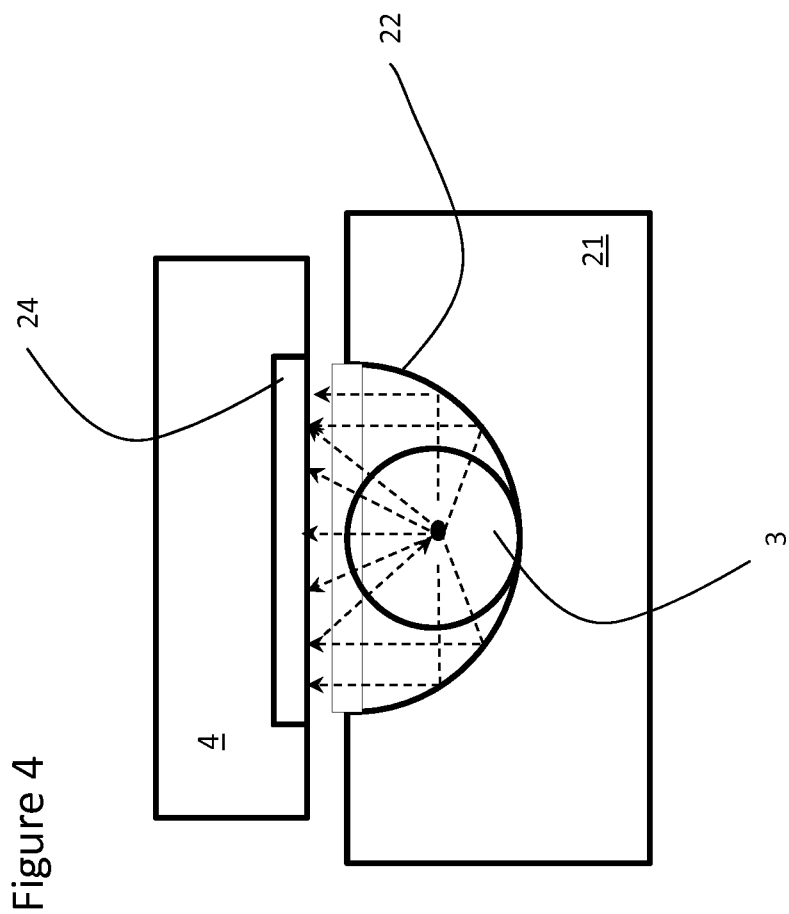

POWER MONITOR FOR OPTICAL FIBER USING BACKGROUND SCATTERING

TECHNICAL FIELD

The present invention relates to an optical power monitor, and in particular to an optical power monitor for detecting Rayleigh scattering from an optical fiber.

BACKGROUND OF THE INVENTION

Indirectly measuring optical power in a fiber laser system, i.e. without putting a power measuring device directly into the optical path, is desirable, because of a lack of accessibility to the measuring point and the high cost of power measuring equipment. In order to perform an indirect power measurement, sampling of the optical power in the fiber being measured is required. Sampling of optical power propagating in the core of an optical fiber is commonly done using a fused fiber tap coupler or by detecting the scattered light from a fiber fusion splice location. Conventional sampling methods often work reasonably well with low power single-mode (SM) fiber laser systems, but have limitations in fiber optical systems with large-mode-area (LMA) or multi-mode (MM) fibers and high-power fiber laser systems. One drawback of conventional methods with LMA or MM fibers is that the sampling ratio is not identical across all transversal modes of the fiber. Thus, detected signal levels from both fused fiber tap couplers and splice scattering light monitors not only varies with the power propagating in the fiber core, but also fluctuates with the composition of the transversal modes. Moreover, in high-power fiber laser systems, a fuse fiber tap coupler or splice point is not always feasible or desirable, because they might not be able to handle the optical power level or because of the associated penalties on the output power and beam quality.

Prior art references, including U.S. Pat. No. 5,015,067 issued May 14, 1991 to Lavatter; U.S. Pat. No. 5,319,195 issued Jun. 7, 1994 to Jones et al; U.S. Pat. No. 7,146,073 issued Dec. 5, 2006 to Wan; and U.S. Pat. No. 7,957,438 issued Jun. 7, 2011 to Simons et al, disclose the use of a photodetector in close proximity to an optical fiber for measuring optical power. However, the Lavatter reference discloses using fluorescent light from a special coating to detect cladding light. Jones et al discloses detecting cladding light by out-coupling some of the cladding light. The Wan reference discloses using a special cladding treatment to scatter cladding light and monitoring the cladding light power, and Simons et al disclose using the light, which failed to couple into the fiber core, to estimate the power inside the core.

An object of the present invention is to overcome the shortcomings of the prior art by providing an optical power monitor that only utilizes Rayleigh scattering from the core of an optical fiber.

SUMMARY OF THE INVENTION

Accordingly, the present invention relates to an optical power monitoring device for determining optical power of an optical signal transmitted in an optical fiber core surrounded by a cladding comprising:

a photo detector disposed in close proximity to the optical fiber cladding for measuring Rayleigh scattered light from the core of the optical fiber through the cladding;

a cladding light stripper for removing light from the cladding to ensure only Rayleigh scattered light from the fiber core is measured by the photo detector; and a controller for converting Rayleigh scattered light measurements from the photo detector into optical power measurements based on a predetermined correlation function therebetween.

Another aspect of the present invention relates to a method of determining optical power of an optical signal transmitted in an optical fiber core surrounded by cladding comprising:

measuring Rayleigh scattered light from the core of the optical fiber through the cladding with a photodetector;

stripping light from the cladding to ensure only Rayleigh scattered light is measured by the photo detector; and converting Rayleigh scattered light measurements from the photo detector into optical power measurements based on a predetermined correlation function therebetween.

BRIEF DESCRIPTION OF THE DRAWINGS

The invention will be described in greater detail with reference to the accompanying drawings which represent preferred embodiments thereof, wherein:

FIG. 4 is a lateral cross-sectional view of the device of FIG. 1.

DETAILED DESCRIPTION

The method of measuring optical power in the core of an optical fiber in accordance with the present invention utilizes the intrinsic property of background scattering loss of an optical fiber. Background loss of a typical passive fiber core is in the range 0.1 dB/km to 10 dB/km, and the background loss level depends on the fiber manufacturing process and the operating wavelength. 0.1 dB/km loss corresponds to $2.3 \times 10^{-8}$/mm loss and 10 dB/km loss corresponds to $2.3 \times 10^{-6}$/mm loss. Several factors contribute to the background loss of the fiber and the primary ones are the absorption from impurities and Rayleigh scattering. Rayleigh scattering scatters a small fraction of optical power out of the fiber from the core. The coefficient of Rayleigh scattering is insensitive to the transversal modes and does not vary in majority of the operating conditions. Thus, the intensity of Rayleigh scattered light from the fiber core is directly proportional to the optical power propagating inside the fiber core and can be used with SM, LMA, and MM fibers as a power sampling mechanism.

Figure 1:
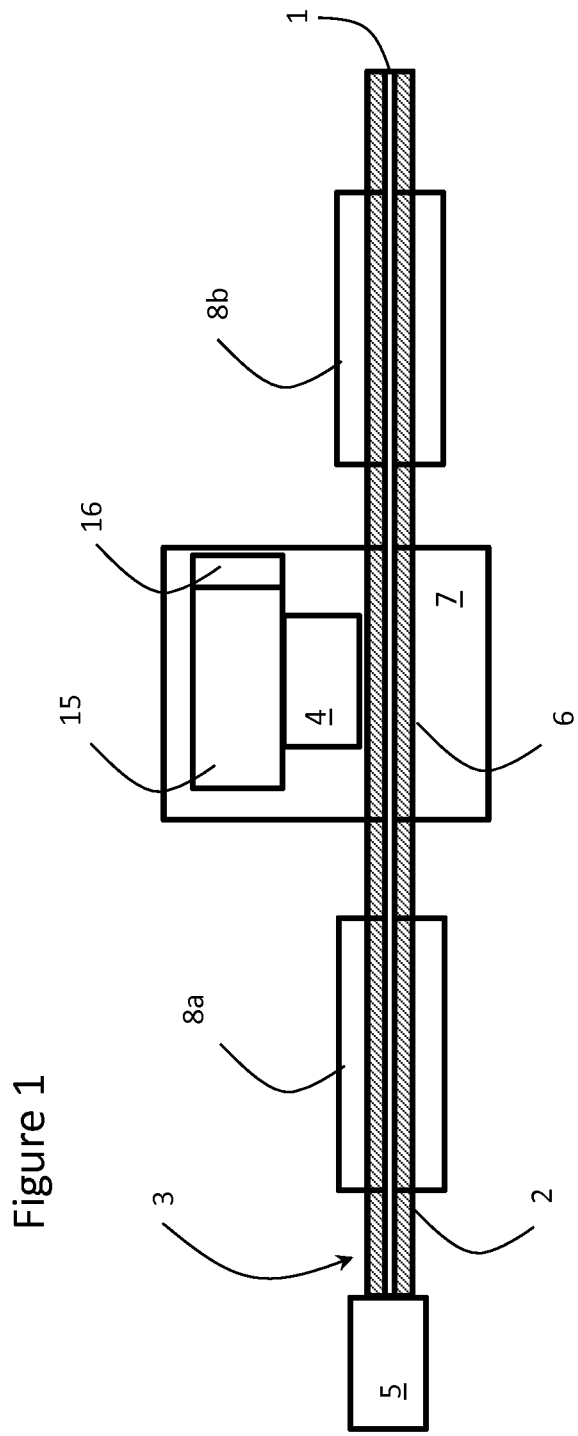
FIG. 1 is a longitudinal cross-sectional view of an optical power measuring device in accordance with the present invention.

With reference to FIG. 1, in order to detect the power in the fiber core 1 surrounded by cladding 2 of an optical fiber 3 using a Rayleigh-scattering based monitoring method, a photo detector 4 is mounted in close proximity, e.g. within 1 cm, preferably within 5 mm, more preferably within 2 mm and most preferably in contact the fiber, to a section 6 of the optical fiber 3 which is going to be detected for capturing the Rayleigh scattered light from the fiber core 1 transmitted through the cladding 2 from laser source 5.

The intensity of Rayleigh scattered power is generally weak, e.g. the loss is $2.3 \times 10^{-6}$/mm to $2.3 \times 10^{-8}$/mm for 10 dB/km to 0.1 dB/km loss. Accordingly, the Rayleigh scattered signal is 230 uW to 2.3 uW for 100W of signal due to the low scattering loss of current passive fiber manufacturing processes, compared to the power being estimated, e.g. high power fiber laser generate a few hundred watts to few kilowatts of power. Accordingly, in a preferred embodiment the photodetector 3 and the section 6 of the passive fiber being detected is encased in a light tight housing or package 7 in order to block any ambient light from the environment around the photo detector 4 from impinging on or illuminating the photodetector 4.

One way of ensuring only the Rayleigh scattered light from the core 1 of the fiber 3 is measured by the photodetector 4 is to mount a first light stripper 8a on one side, e.g. upstream, of the photodetector 4, and ideally a second light stripper 8b on the other side, i.e. downstream, of the photodetector 4. The light strippers 8a and 8b are used to strip out residual light in the fiber cladding 2 and jacket that might affect the accuracy of Rayleigh scattered light detection. Any suitable cladding light stripper can be used, such as the scalable cladding mode stripper device disclosed in U.S. Pat. No. 8,027,555 issued Sep. 27, 2011 to Kliner et al, which is incorporated herein by reference.

Figure 2:
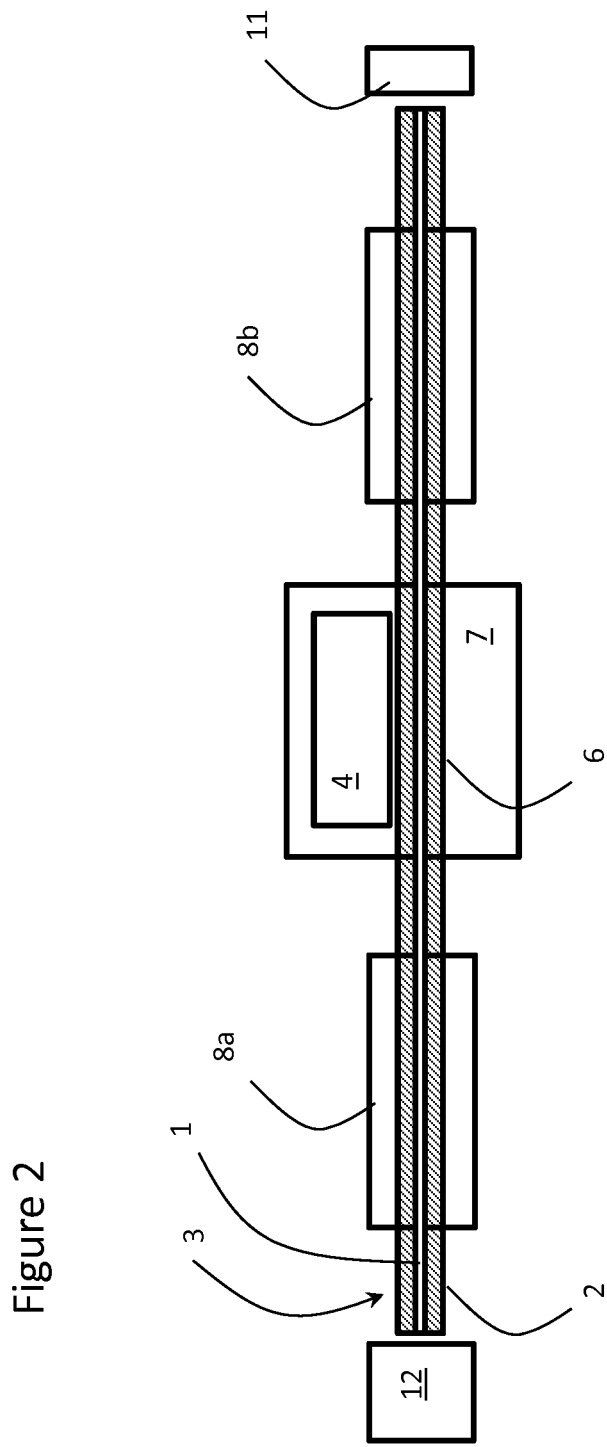
FIG. 2 is a longitudinal cross-section view of the device of FIG. 1
Figure 3:
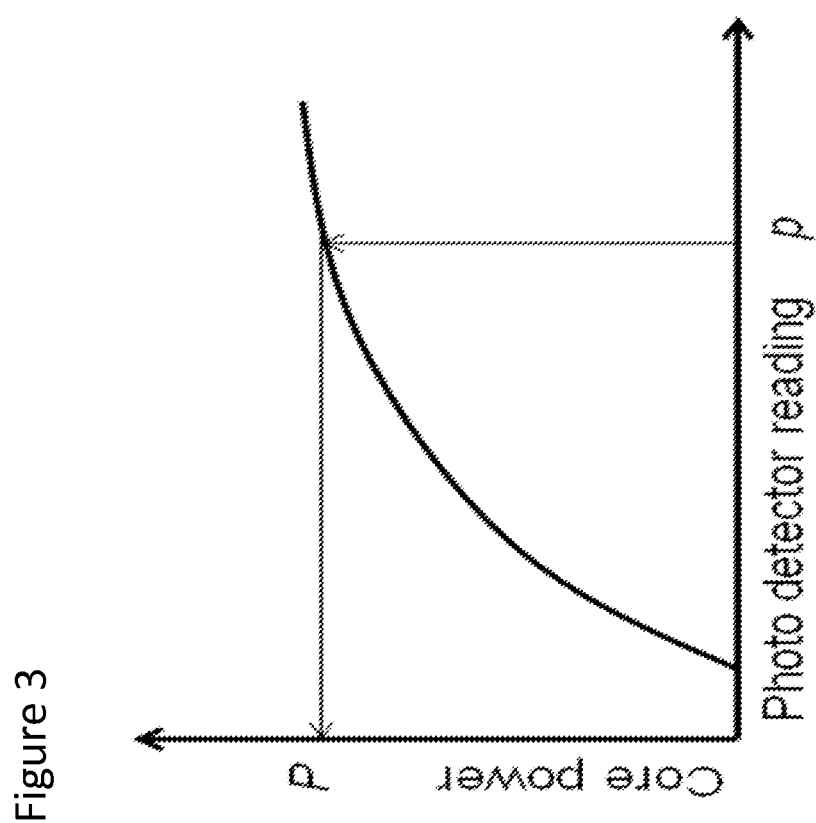
FIG. 3 is a plot of a correlation function between fiber core power P and photodetector reading p.

With reference to FIG. 2, an initial calibration step can be carried out to establish a correlation function between the signal level $pd_0$ from the photodetector 4 and the power $P_0$ propagating in the fiber core 1, if this relationship isn't already known. During calibration, a second photodetector 11 is disposed at an end of the optical fiber 3 to measure the true output power $P_0$ in the optical fiber 3. Subsequently, input power to a source 12, e.g. laser, of the optical power is increased, e.g. gradually or stepwise, to obtain a plurality of $pd_{1-n}$, vs $P_{1-n}$, points. From the points the correlation function is determined, e.g. in the form of an equation or plot of the signal level $pd_0$ of the photodetector 4 vs the output power $P_0$ using interpolation and if need be extrapolation. If the reading $pd_0$ of the photodetector 4 is not proportional to the incident power $P_0$ into the second photodetector 11, a non-linear function, e.g. curve, of photodetector 4 reading (pd) vs. power meter 11 (P) can be generated as a power mapping plot, see FIG. 3. Once the ratio between the photo detector signal $pd_0$ and the power $P_0$ inside the fiber core 1 is established, the power being detected can then be directly calculated from the gain level of the photo detector 4. For example, if the electrical reading from the photo detector 4 is $pd_1$, the power $P_1$ propagating inside the fiber core 1 is simply $P_1 = pd_1 \times P_0/pd_0$. The correlation function is then stored in a non-volatile memory 15 associated with a computer controller 16, which is connected to the photodetector 4, either within in the package 7 or at a remote location.

With reference to FIG. 4, the radiation pattern of the Rayleigh scattered light is determined by the polarization of the incident light. Therefore, the output signal level pd of the photodetector 4 may vary with the polarization state of the light being detected in the optical fiber 3. To overcome these inconsistencies, a reflector 21 is disposed adjacent to the optical fiber 3 for reflecting light scattered in various directions towards the photodetector 4. In a preferred embodiment, the reflector 21 is in the form of reflective groove or channel in which the optical fiber 3 is disposed, so that light scattered from the core 1 in different directions all gets reflected in the same, e.g. upward, direction. Ideally, the reflective fiber groove 21 is a semicircular groove 22 having a radius equal to or greater than the diameter of the optical fiber 3, i.e. the diameter of the semicircular groove 22 is at least twice the diameter of the optical fiber 3, with the optical fiber 3 disposed completely within the semicircular groove 22. Accordingly, the photodetector 4, has an active area 24 wider than the diameter of the optical fiber 3, e.g. at least 2× the diameter of the optical fiber 3 or greater than or equal to the diameter of the reflective fiber groove 21, to collect all the light reflected by the reflector 21. By collecting the Rayleigh-scattered light using the reflective fiber groove 21, the optical power being detected by the photodetector 4 is increased and thus the signal strength of the photodetector 4 is increased. Also, the detection error due to the rotation of the polarization state of the signal being detected is dramatically reduced.

I claim:

1. An optical power monitoring device configured for determining optical power of an optical signal transmitted in an optical fiber core surrounded by a cladding comprising:
   a photo detector disposed in close proximity to the optical fiber cladding configured such that it measures optical power measurements of Rayleigh scattered light from the core of the optical fiber through the cladding;
   a cladding light stripper configured such that it removes light from the cladding to ensure only Rayleigh scattered light from the fiber core is measured by the photo detector; and
   a controller configured such that it converts the Rayleigh scattered light optical power measurements from the photo detector into optical power measurements for the optical signal based on a predetermined correlation function therebetween in the form of an equation or plot of the optical power measurements from the photo detector versus the optical power of the optical signal.

2. The device according to claim 1, further comprising a laser light source for generating the optical signal.

3. The device according to claim 1, wherein the predetermined correlation function comprises a non-linear relationship.

4. The device according to claim 1, further comprising a light-tight housing encasing the photo detector for preventing ambient light from impinging upon the photo detector.

5. The device according to claim 1, further comprising a reflector disposed adjacent to the optical fiber for reflecting Rayleigh scattered light from the fiber core towards the photodetector.

6. The device according to claim 5, wherein the reflector comprises a semi-circular channel within which the optical fiber is disposed.

7. The device according to claim 6, wherein the semi-circular channel has a diameter at least twice as wide as a width of the optical fiber.

8. The device according to claim 7, wherein the photodetector has an active area at least as wide as the diameter of the semi-circular channel, and disposed to capture light reflected by the reflector.

9. The device according to claim 1, wherein the cladding stripper comprises a first cladding stripper disposed upstream of the photo detector.

10. The device according to claim 9, wherein the cladding stripper also comprises a second cladding stripper disposed downstream of the photo detector.

11. A method of determining optical power of an optical signal transmitted in an optical fiber core surrounded by cladding comprising:
   measuring optical power measurements of Rayleigh scattered light from the core of the optical fiber through the cladding with a photodetector;
   stripping light from the cladding to ensure only Rayleigh scattered light is measured by the photo detector; and
   converting Rayleigh scattered light measurements from the photo detector into optical power measurements based on a predetermined correlation function therebetween, said predetermined correlation function comprising an equation or plot of the optical power measurements from the photo detector versus the optical power of the optical signal.

12. The method according to claim 11, further comprising determining the correlation function by obtaining a plurality of photo detector measurements and corresponding optical power measurements, and generating the correlation function therefrom.

13. The method according to claim 11, wherein the predetermined correlation function comprises a non-linear relationship.

14. The method according to claim 11, further comprising encasing the photodetector in a light-tight housing for preventing ambient light from impinging upon the photo detector.

15. The method according to claim 11, further comprising providing a reflector disposed adjacent to the optical fiber for reflecting Rayleigh scattered light towards the photodetector.

16. The method according to claim 15, wherein the reflector comprises a semi-circular channel within which the optical fiber is disposed.

17. The method according to claim 16, wherein the semi-circular channel has a diameter at least twice as wide as a width of the optical fiber.

18. The method according to claim 17, wherein the photodetector has an active area at least as wide as the diameter of the semi-circular channel, and disposed to capture light reflected by the reflector.

19. The method according to claim 11, wherein the step of stripping light from the cladding comprises providing a first cladding stripper disposed upstream of the photo detector.

20. The method according to claim 19, wherein the step of stripping light from the cladding also comprises providing a second cladding stripper disposed downstream of the photo detector.

* * * * *